May 23, 1939.　　　E. FREYSTEDT ET AL　　　2,159,790
FREQUENCY ANALYZER
Filed Aug. 12, 1936
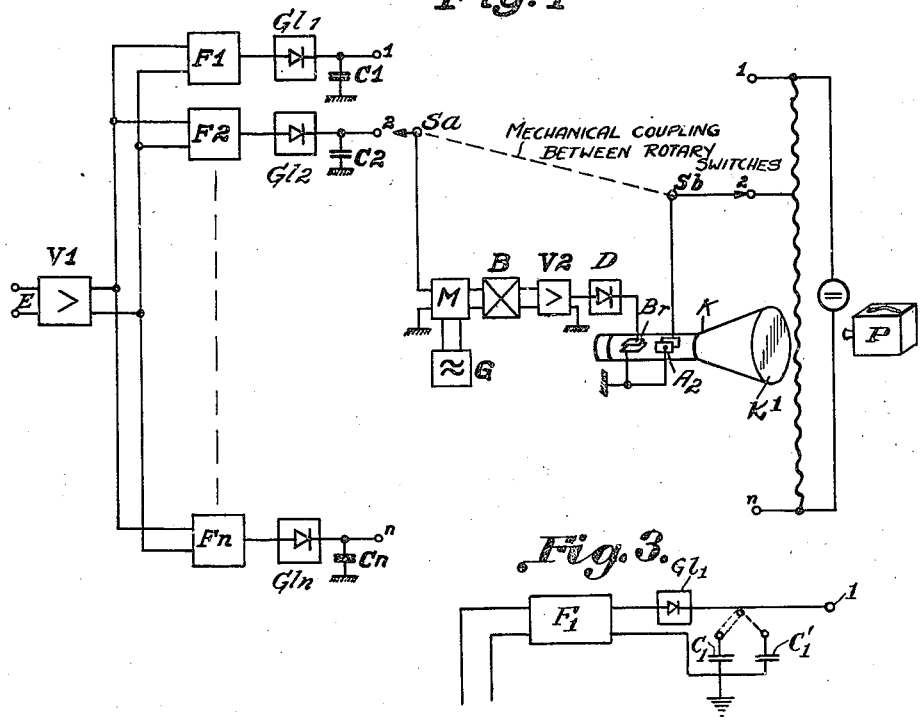
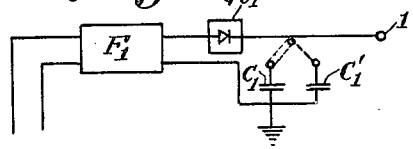
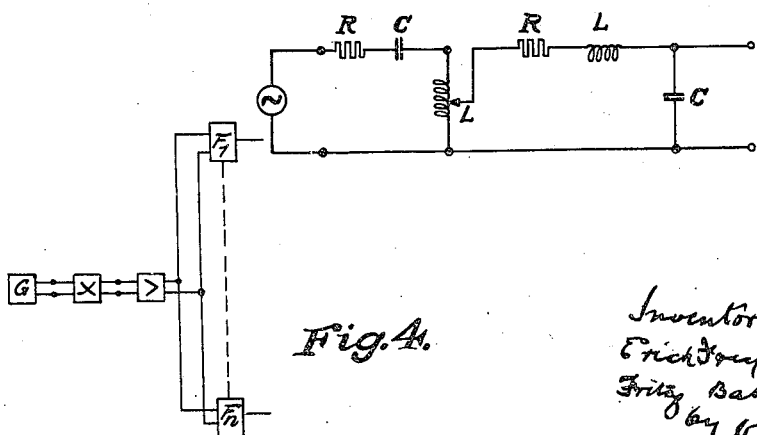

Patented May 23, 1939

2,159,790

UNITED STATES PATENT OFFICE 2,159,790

FREQUENCY ANALYZER

Erich Freystedt, Berlin-Siemensstadt, and Fritz Bath, Berlin-Haselhorst, Germany, assignors to Siemens & Halske, Aktiengesellschaft, Siemensstadt, near Berlin, Germany, a corporation of Germany Application August 12, 1936, Serial No. 95,700
In Germany August 13, 1935

7 Claims. (Cl. 175—183)

Our invention relates to improvements in frequency analyzers. The analysis of frequency spectra and the measurement of the relationship between the transmission unit and the frequency are determining factors in the development of apparatus for the electrical speech transmission. Of importance is, for instance, the analysis of speech and music or the composition of a detonation or of noises caused by motors or otherwise of single line or band frequency spectra, further also the frequency curve of the individual members of an electroacoustic apparatus such as amplifiers, microphones, loudspeakers etc. as well as the resultant frequency curve of the entire apparatus in operation. Methods have been proposed to record such frequencies point by point. In this case integrating voltmeters which measure the effective value are employed for the input and output alternating voltages and the points obtained are connected by a steady curve.

Instead of using this complicated and time-absorbing method it has also been proposed to record the frequency curve with the aid of an automatic registering device in which the measuring frequency steadily traverses the entire tonic range to be analyzed and the values measured are at the same time recorded by the indicating instrument. Also this method is, however, disadvantageous in that it is necessary to maintain the speed of the change in frequency so small that the indicating device has sufficient time to follow the fluctuations of the transmission unit. Timely constant processes may be properly analyzed in this manner. However, in the case of noises of relatively short duration or fluctuating intensity or composition the matter is quite different. According to known methods a time of ½ up to about 5 minutes is necessary for the production of a curve so that detonations, noises caused by speech etc. cannot in practice be analyzed.

The object of our invention is to eliminate the above drawback. To this end, a frequency analyzer is provided which in the case of a direct, particularly optical indication over the entire frequency spectrum to be analyzed attains such a high speed of analysis that the entire frequency spectrum is traversed at least once per second. However, also still much higher speeds of analysis may be attained.

Such a rapidly operating frequency analyzer may be made according to the invention by providing a plurality of parallel connected filters, whereby the detrimental building-up time is reduced.

Our invention is illustrated diagrammatically in the accompanying drawing in which Fig. 1 shows the general circuit layout of the analyzer; Fig. 2 an example of an individual filter circuit arrangement such as is implied in $F_1 \ldots F_n$ in Fig. 1; Fig. 3 shows a modified form of the storage condenser for each filter circuit, and Fig. 4 shows a part of the circuit, Fig. 1, including a device the frequency characteristic of which is to be analyzed.

Referring to Fig. 1, the frequency spectrum to be analyzed is supplied to the terminals E and to the parallel-connected filters $F_1, F_2 \ldots F_n$ through an amplifier $V_1$. These filters are designed in the form of band filters and are preferably logarithmically distributed over the range of frequency to be analyzed. By means of a mechanical switch $S_a$ the output voltages of the filters after passing the rectifiers $G_1 \ldots G_n$ and condensers $C_1 \ldots C_n$ are supplied in rapid sequence to a modulator M, the condensers $C_1 \ldots C_n$ serving to store up the output voltages. The modulator receives the carrier wave from the generator G. The modulated frequency is now supplied to the indicating device by means of a band filter B through an amplifier $V_2$ and the rectifier D.

A cathode ray tube K is preferably employed for the optical indication of the output voltages. The output voltage behind the rectifier D is in that case supplied to a pair of deflecting plates $B_r$ of the cathode ray tube.

According to the invention it is also possible to attain a simultaneous indication of all filter voltages in the form of an amplitude spectrum. If the voltage to be tested is supplied to the vertical pair of deflecting plates of the cathode ray oscillograph a synchronous time deflection in the horizontal direction may be atained by means of the other pair of plates. To this end, the horizontal pair of plates $A_2$ is impressed with a direct current potential, the magnitude of which is varied synchronously with the changing over of the filters $F_1 \ldots F_n$ by means of a switch $S_b$ operating synchronously with the switch $S_a$ and, for instance, operatively coupled therewith. This may be attained in any conventional manner, immaterial so far as the present invention is concerned, and is therefore indicated only by a dash line between rotary switches $S_a$ and $S_b$ and by a corresponding legend. A spectrum of the individual output voltages of the filters $F_1 \ldots F_n$ is thus obtained, the individual frequencies corresponding to the filter transmission ranges appearing on the base line close to one another as vertical lines. If now all rectifier outputs 1 ... n are rapidly connected to the modulator input M so that the eye remains impressed by the light, that is for instance 20 times per second, a frequency spectrum is attained similar to the form of a light line split up by means of a prism into a band spectrum as shown on the screen K' of tube K.

Particular attention is to be drawn to the dimensioning of the filter. To attain an analysis of frequency as exact as possible it is desirable to employ as many filters as possible, i. e., as many individual ranges as possible. However, in this manner the number of units (filters, rectifiers, condensers etc.) increases considerably, since apart from the number of the filters also the side slope thereof must be increased to a great extent. In practice, it suffices in most cases to arrange about three filters per octave, since in general there is an interest in only a range of frequencies varying from 30 to 5000 cycles, for which about 22 filters are then employed. However, in particular cases also a further subdivision may be of advantage, if, for instance, an extremely narrow frequency band is to be analyzed. The range of frequencies may be increased at will beyond the above-indicated value in detail. By connecting the filters in parallel relation all filters may build up their maximum amplitude at the same time and, therefore, the detrimental building-up time for the entire spectrum is only dependent upon the building-up time of the narrowest filter. If the latter has a width of 10 cycles, the building-up time for the entire spectrum amounts to about $\frac{1}{10}$ second.

In order to attain a sufficiently great selectivity with the smallest possible number of units filters are preferably employed as shown in Fig. 2. Such a filter consists of two resonant circuits coupled in the most favorable manner. Each of these circuits comprises an inductance L, a capacity C and an ohmic resistance R. The coupling is effected by tapping the inductance of the first circuit. Filter curves of sufficient slope are thus obtained. Every two adjacent filters are preferably so arranged that for a tone of a given amplitude the sum of the effective values of the indicated lines remains as far as possible independent of the relative position in the frequency spectrum of the tone. This may be attained, if the filter curves of two adjacent filters intersect at about 0.7 of their maximum height.

By the system as shown in Fig. 1 an amplitude scale directly proportional to the voltage supplied is obtained on the fluorescent screen of the Braun tube oscillograph. By the use of a specially designed non-linear intermediate member, such as the amplifier $V_2$ the amplitude scale on the screen K' may be also made for a given range logarithmical instead of linear. This may be of particular importance, if frequency spectra differing in amplitude considerably should be analyzed.

Also storage condensers (denoted by $C_1 \ldots C_n$ in Fig. 1) are provided at the filter outlets. The condensers are charged to the corresponding peak value of the outlet alternating voltage. According to the invention the capacity of the condensers may be so increased by switching over as shown in Fig. 3 at $C_1$ and $C_1'$ that their discharge becomes considerably slower. In this manner, it is possible to maintain a spectrum, normally available only for a short time, for a considerably longer time so that it may be conveniently observed. Even in the case of rapidly varying frequency spectra such storage condensers of increased capacity are under certain circumstances of particular value, since they permit a timely formation of average values.

Since the system according to the invention produces a light effect which remains for a certain length of time it is also possible to photograph the processes which occur very rapidly. Since it is readily possible to arrange the building-up time for the entire spectrum to amount to $\frac{1}{10}$ sec. or less, 10 pictures per second may, for instance, be taken. In this manner the analyzer is utilized to its full capacity. It is of particular advantage to provide the frequency analyzer with a cinema camera, for instance, with a substandard (small film) cinema camera indicated at P which permits continuous recording of the processes to be analyzed.

By the frequency analyzer made according to the invention it is also possible to rapidly measure or test transmission means, such as lines, transformers, microphones, loudspeakers, amplifiers etc., which is in practice of great importance. The objects to be measured are impressed with a continuous frequency band or a line spectrum of known composition and distribution of amplitudes and their outputs are connected to the analyzer. The dampings varying in accordance with the frequency, non linearities etc. present in the object to be tested may be then directly perceived and thus easier eliminated. This modification is diagrammatically illustrated in Fig. 4, which shows the first portion of the analyzer circuit of Fig. 1, and in which G represents an electric generator for producing currents of a continuous frequency band of known normal composition and amplitudes and of the desired frequency range. This generator delivers its output to the input side of the device X to be analyzed, the output side of which is connected to an amplifier $V_1$, which in turn supplies the energy to the filter circuits $F_1$—$F_n$ in the manner illustrated in Fig. 1, so that amplitudes differing from the normal amplitudes, which the generator G would directly show at the different frequencies, can be observed on the indicator screen K'.

We claim as our invention:

1. A frequency analyzer for direct indication over the entire frequency spectrum to be analyzed having a source of current containing the frequencies of the spectrum, a plurality of filter circuits connected in parallel to said source and dimensioned with respect to their respective constants to divide the entire spectrum into a corresponding plurality of frequency ranges, a rectifier connected to the output end of each filter circuit and a storage condenser connected to each rectifier to be charged by the latter, a cathode ray oscillograph and its associated circuits including a carrier frequency generator, a modulator for said carrier frequency, a band pass filter and a rectifier, and a rotary switch for connecting the charged condensers in continuous rapid succession to said modulator.

2. A frequency analyzer for direct indication over the entire frequency spectrum to be analyzed having a source of current containing the frequencies of the spectrum, a plurality of filter circuits connected in parallel to said source and dimensioned with respect to their respective constants to divide the entire spectrum into a corresponding plurality of frequency ranges, a rectifier connected to the output end of each filter circuit and a storage condenser connected to each rectifier to be charged by the latter, a cathode ray oscillograph and its associated circuits including a carrier frequency generator, a modulator for said carrier frequency, a band pass filter, and a rotary switch for connecting the charged condensers in continuous rapid succession to said modulator.

3. A frequency analyzer for direct indication over the entire frequency spectrum to be analyzed having a source of current containing the frequencies of the spectrum, a plurality of filter circuits connected in parallel to said source and dimensioned with respect to their respective constants to divide the entire spectrum into a corresponding plurality of frequency ranges at the ratio of three filters per octave, a rectifier connected to the output end of each filter circuit and a storage condenser connected to each rectifier to be charged by the latter, a cathode ray oscillograph and its associated circuits including a carrier frequency generator, a modulator for said carrier frequency, a band pass filter and a rectifier, and a rotary switch for connecting the charged condensers in continuous rapid succession to said modulator.

4. A frequency analyzer for direct indication over the entire frequency spectrum to be analyzed having a source of current containing the frequencies of the spectrum, a plurality of filter circuits connected in parallel to said source and dimensioned with respect to their respective constants to divide the entire spectrum logarithmically into a corresponding plurality of frequency ranges, a rectifier connected to the output end of each filter circuit and a storage condenser connected to each rectifier to be charged by the latter, a cathode ray oscillograph and its associated circuits including a carrier frequency generator, a modulator for said carrier frequency, a band pass filter and a rectifier, and a rotary switch for connecting the charged condensers in continuous rapid succession to said modulator.

5. A frequency analyzer for direct indication over the entire frequency spectrum to be analyzed having a source of current containing the frequencies of the spectrum, a plurality of filter circuits connected in parallel to said source and dimensioned with respect to their respective constants to divide the entire spectrum into a corresponding plurality of frequency ranges, said filter circuits having suitable internal coupling to produce filter curves of sufficient slope so that the curves of two adjacent filters intersect at an amplitude value at which for frequencies of a given amplitude the sum of the effective values of the indicated amplitudes remains substantially independent of the relative position of the particular frequency in the spectrum, a rectifier connected to the output end of each filter circuit and a storage condenser connected to each rectifier to be charged by the latter, a cathode ray oscillograph and its associated circuits including a carrier frequency generator, a modulator for said carrier frequency, a band pass filter and a rectifier, and a rotary switch for connecting the charged condensers in continuous rapid succession to said modulator.

6. A frequency analyzer for direct indication over the entire frequency spectrum to be analyzed having a source of current containing the frequencies of the spectrum, a plurality of filter circuits connected in parallel to said source and dimensioned with respect to their respective constants to divide the entire spectrum into a corresponding plurality of frequency ranges, said filter circuits having suitable internal coupling to produce filter curves of sufficient slope so that the curves of two adjacent filters intersect at an amplitude value of approximately 0.7 of their maximum values, a rectifier connected to the output end of each filter circuit and a storage condenser connected to each rectifier to be charged by the latter, a cathode ray oscillograph and its associated circuits including a carrier frequency generator, a modulator for said carrier frequency, a band pass filter and a rectifier, and a rotary switch for connecting the charged condensers in continuous rapid succession to said modulator.

7. A frequency analyzer for direct indication over the entire frequency spectrum to be analyzed having a source of current containing the frequencies of the spectrum, a plurality of filter circuits connected in parallel to said source and dimensioned with respect to their respective constants to divide the entire spectrum into a corresponding plurality of frequency ranges, a rectifier connected to the output end of each filter circuit and a storage condenser connected to each rectifier to be charged by the latter, a cathode ray oscillograph and its associated circuits including a carrier frequency generator and a non-linear transmitting element, a modulator for said carrier frequency, a band pass filter and a rectifier, and a rotary switch for connecting the charged condensers in continuous rapid succession to said modulator.

ERICH FREYSTEDT.
FRITZ BATH.